April 24, 1934.　　　　H. IRMSCHER　　　　1,955,811
CUTTING MECHANISM FOR BAG FORMING MACHINES
Original Filed July 6, 1931　　5 Sheets-Sheet 1

INVENTOR
HANS IRMSCHER
BY
ATTORNEYS

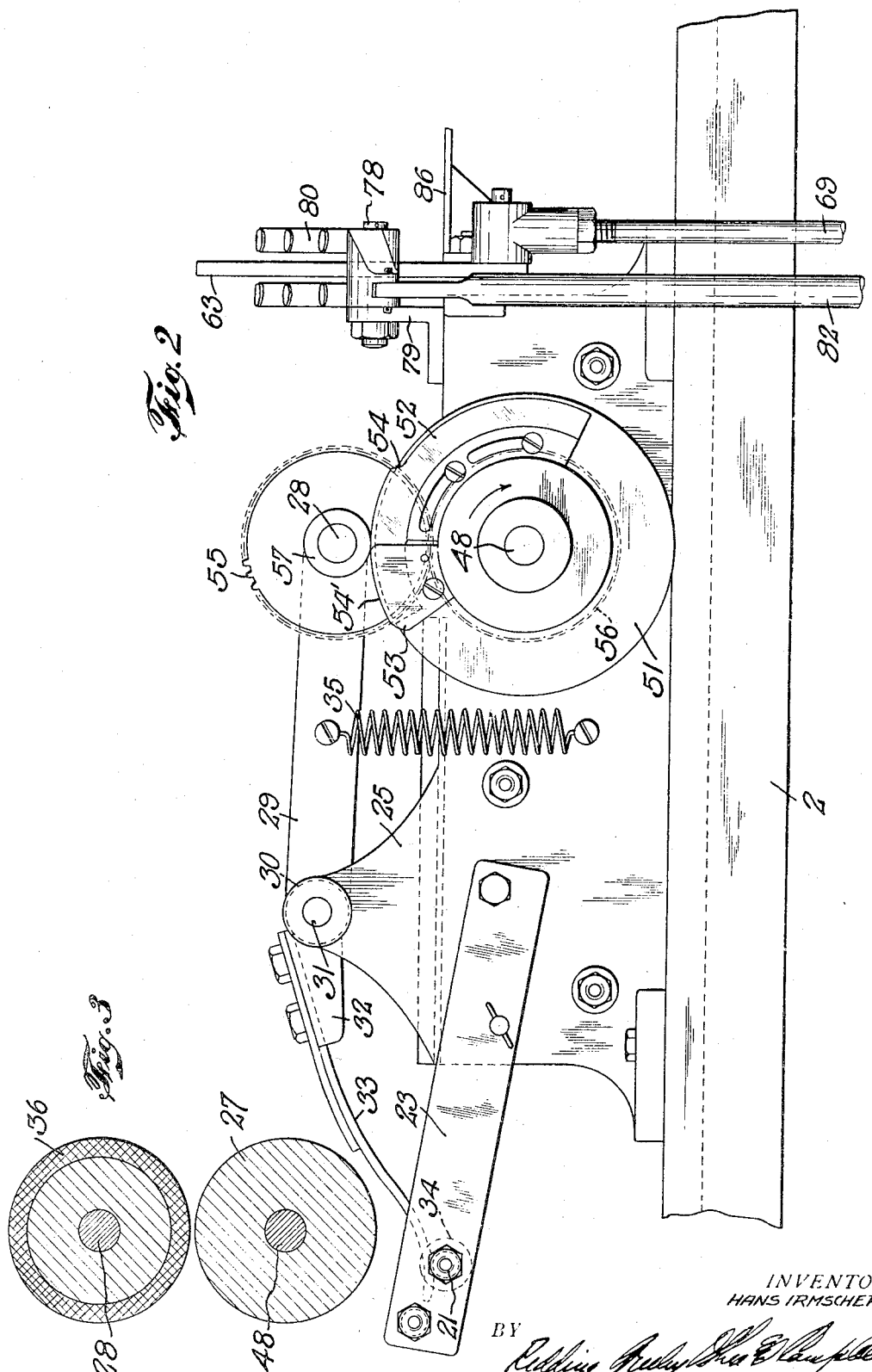

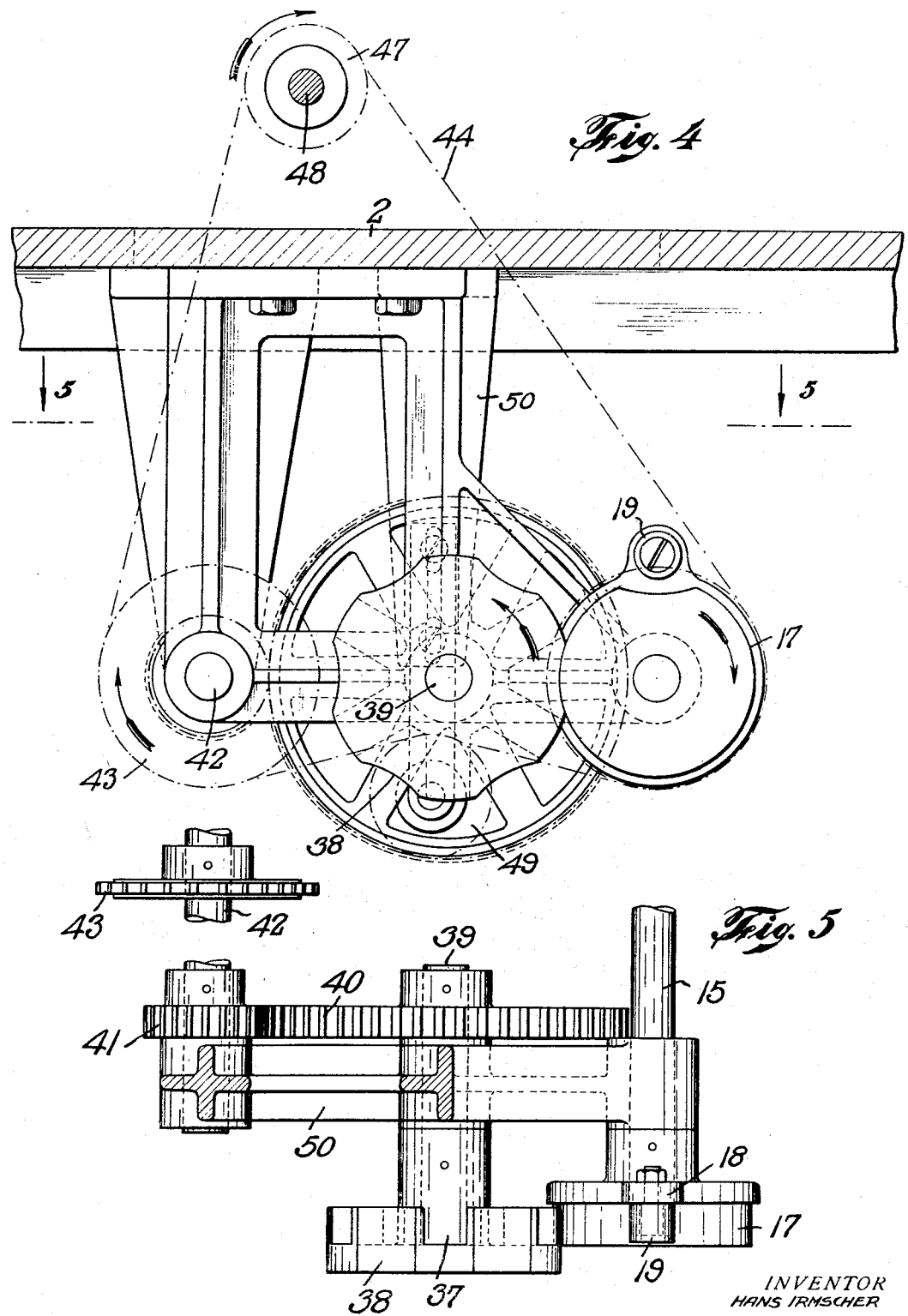

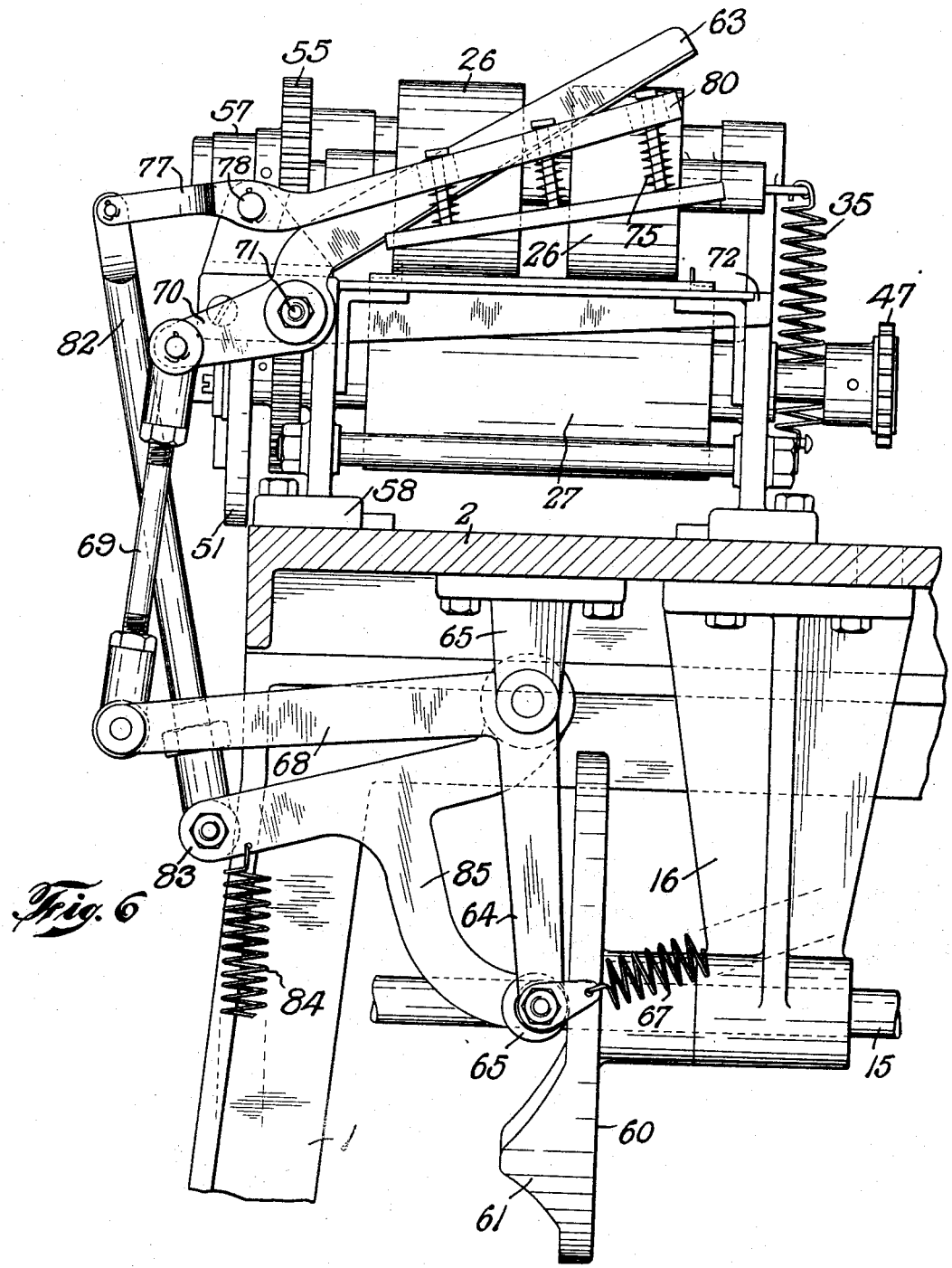

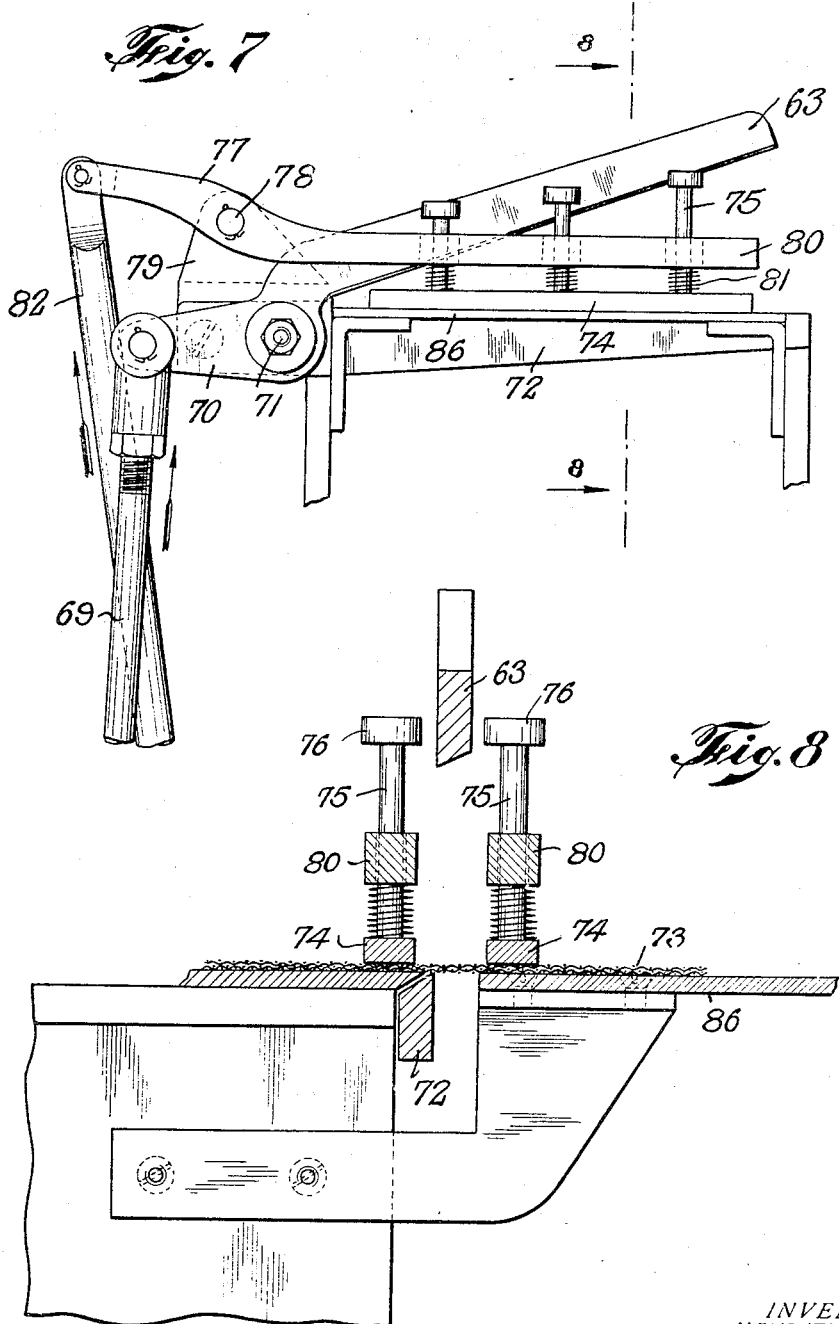

Patented Apr. 24, 1934

1,955,811

UNITED STATES PATENT OFFICE 1,955,811

CUTTING MECHANISM FOR BAG FORMING MACHINES

Hans Irmscher, New York, N. Y., assignor to Millie Patent Holding Co. Inc., New York, N. Y., a corporation of New York Original application July 6, 1931, Serial No. 548,971. Divided and this application May 17, 1932, Serial No. 611,807

4 Claims. (Cl. 164—41)

This application is a division of applicant's copending application Ser. No. 548,971 for Bag forming machine, filed July 6, 1931.

The present invention relates to bag forming machines and embodies, more specifically, an improved cutting machine for cutting successive lengths of material for use in making bags from a continuously available source of the material.

While the invention has been designed primarily for use in connection with forming bags adapted to receive tea, it will be apparent that the device is applicable for use in connection with a great number of manufacturing operations, wherein a pliable material is to be formed in the manner to be described hereinafter.

An object of the invention is to provide a mechanism for cutting lengths of material successively from a continuous source, such mechanism being provided with a holding mechanism which operates synchronously therewith to hold the material during the cutting operation.

A further object of the invention is to provide, in a device of the above character, an improved cutting mechanism which effectively holds the material to be cut in a given position and subsequently effects the cutting thereof, this operation being done by means of synchronized power mechanisms.

A further detailed object of the invention is to provide, in combination with a cutting mechanism as described above, a device for feeding intermittently the supply of material to the cutting mechanism, the feeding being done between each cutting operation and the material being held effectively against movement during the cutting operations.

A further object of the invention is to provide, in combination with a cutting mechanism as described above, a device for varying the lengths of material cut. In this connection, it is proposed to provide a suitable carriage upon which the cutting mechanism is mounted, such carriage being adjustably mounted to enable the machine to adapt itself to deliver varying lengths of bags.

Further objects, not specifically enumerated above, will be apparent as the invention is described in greater detail in connection with the accompanying drawings, wherein:

Figure 2 is a view in side elevation showing the cutting mechanism of Figure 1.

Figure 3 is a detail view showing the rolls for effecting the movement of the material to be cut, these rolls being ilustrated in Figures 1 and 2.

Figure 4 is a view in section, showing the driving mechanism for the cutting mechanism of Figures 1 and 2.

Figure 5 is a view in section taken on line 5—5 of Figure 4, and looking in the direction of the arrows.

Figure 6 is a view in end elevation, taken on a plane passing through a supporting table, showing the cutting mechanism of Figures 1 and 2, as well as a portion of the driving mechanism of Figure 4.

Figure 7 is a detail view showing the actuation of the cutting and holding mechanism of the present invention.

Figure 8 is a view in section, taken on line 8—8 of Figure 7, and looking in the direction of the arrows.

Figure 1:
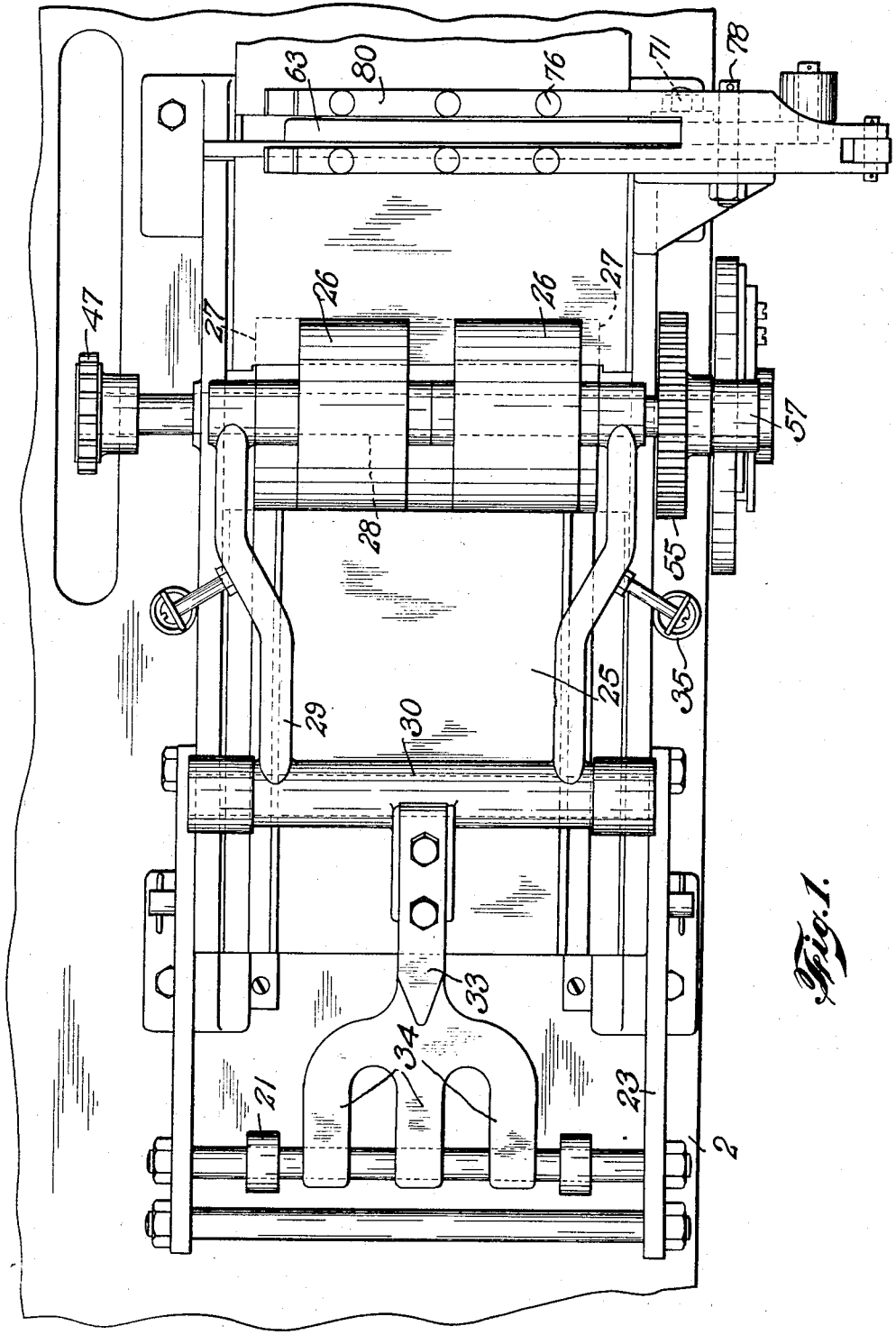
Figure 1 is a plan view of a cutting mechanism constructed in accordance with the present invention.

Referring to the above drawings, the frame of the machine constructed in accordance with the present invention is shown at 1 (Fig. 6), being provided with a suitable table 2. A suitable reel supporting means for a supply of material to be cut may be provided and is not illustrated herein.

As previously stated, the material to be worked is preferably formed as a continuous sleeve in a roll. The material is threaded under a guide rod 20 (Figures 1 and 2) and between guide collars 21. The guide collars 21 are preferably secured upon a cross rod 22 and are carried between spaced arms 23 mounted upon the cutter carriage 24. The material is then passed over the cutter bed 25 and between upper cylindrical rollers 26 and cylindrical roller 27 (Figure 3). The upper rollers 26 are journaled upon a shaft 28 which is mounted between arms 29 which are formed upon a sleeve 30. Sleeve 30 is journaled upon the cutter carriage 24 by means of a rod 31 and is formed with a bracket 32 upon which a spring arm 33 is secured. The spring arm is preferably formed with bifurcated portions forming spring fingers 34, these spring fingers being adapted to engage the material over the rod 22.

Coil springs 35 normally urge the rollers 26 into engagement with the roller 27 and thus elevate the fingers 34 from engagement with the material over the roller 21. The rollers 26 are preferably rubber covered as at 36 to afford suitable friction for controlling more effectively the movement of the material between the rollers and the feeding thereof to the cutting mechanism.

The operation of this feeding mechanism is effected by means of the roller 19 which is mounted on the extension 18 which is rotated by a power shaft 15. Roller 19 engages, successively, slots 37 in a Geneva wheel 38. These slots are, of course, radially formed and allow the power mechanism to actuate the Geneva wheel in an intermittent fashion. The Geneva wheel is keyed to a shaft 39 upon which a driving gear 40 is secured, the shaft 39 being suitably journaled in the frame of the machine as will be apparent from Figure 4. Gear 40 engages a driven gear 41 upon a countershaft 42 which is suitably journaled in the frame of the machine and countershaft 42 drives a sprocket 43 which engages a chain 44 (indicated in dot and dash lines in Figure 4). Chain 44 passes over a driven sprocket 47 which is secured to the shaft 28 upon which cylinder 27 is secured. In order that a suitable take-up mechanism may be afforded for the chain 44 to permit the longitudinal adjustment of driven sprocket 47, an adjustable idler 49 (indicated in dot and dash lines in Figure 4) is mounted upon a bracket 50 carried by the frame of the machine. The position of the idler 49 may thus be adjusted vertically to take up any slack in chain 44.

The intermittent turning movement imparted to the shaft 48 by the foregoing mechanism covers the advancement of the material to the cutting mechanism since the movement of the roller 27 is transmitted to the friction rollers 26 by a means to be described hereinafter. Shaft 48 mounts a wheel 51 upon which an arcuate shaped plate 52 is adjustably secured. A second arcuate plate 53 is also mounted upon the wheel 51 and the plates 52 and 53 are formed with cam surfaces 54, 54' which are adapted to be moved with respect to each other and thus vary the length of the combined circumferential cam face. Shafts 28 and 48 mount gears 55 and 56 which are normally in engagement under the action of springs 35. Shaft 28 also journals a roller 57 which engages the periphery of wheel 51 and the cams 54, 54'. During the rotation of wheel 51 when the roller 57 engages cams 54, 54', the friction rollers 26 are elevated from the roller 27 and the fingers 34 frictionally engage the material to prevent its further advance to the cutting mechanism. During this time, by means of synchronized power take-off mechanism described hereinafter, the cutting of the material is effected. If it is desired to vary the length of the portion cut from the continuous sleeve, the length of the cam 54 is varied, it being borne in mind that the shorter the cam 54, the greater the length of the material cut. To accommodate varying lengths of material which may be cut, the cutter mounting or carriage 24 is adjustably mounted upon the bed 1 by means of bearing pads 58 which may be secured to the bed 1 by means of bolts 59, the bed having suitable slots to receive the bolts and position the pads 58 adjustably. The slack in the chain 44 is then taken up by the idler pulley 44 as previously described and the mechanism is ready for operation.

The material thus fed by the rollers 26 and 27 advances to a cutting mechanism actuated by a wheel 60 which is secured to the power shaft 15. The wheel 60 is formed with an outer cam 61 for actuating the shears or cutting mechanism and an inner cam 62 for actuating the presser feet of the cutting mechanism. In the drawings, the machine is shown with the knife housing removed, the knife of the shears or cutting mechanism being illustrated at 63. A bell crank arm 64 is pivoted upon the bed 1 by means of a bracket 65 and carries a roller 66 which is adapted to engage the cam 61, being urged against the cam 61 and wheel 60 by means of a spring 67. The other arm 68 of the bell crank lever 64 is connected to a link 69 which is connected at its other end to the arm 70 of the knife 63. The knife is pivoted at 71 and movement of the wheel 60 thus actuates the knife intermittently to drop it to its cutting position with respect to a stationary knife 72 (as viewed in Figure 14). The material which has been advanced into the cutter is illustrated at 73 and is shown as being held in the cutting position by means of presser feet 74. These presser feet are mounted upon slide rods 75 having heads 76 to limit the movement of the feet with respect to a bifurcated arm 77 which is journaled at 78 upon a bracket 79 which is secured to the frame of the machine. The bifurcated arm 77 thus provides bifurcations 80 in which the rods 75 slide, coil springs 81 being provided to urge the presser feet 74 normally away from the bifurcations 80 and toward the material 73.

The presser feet are thus operated by means of a rod 82, the movement of which is controlled by a pivoted arm 83. Movement of the arm 83 to elevate the presser feet is effected by means of a coil spring 84, while movement of the arm to cause the feet to engage the material is effected by means of a curved arm 85, upon the extremity of which a roller is mounted to engage the inner cam 62. The circumferential position of the cams 61 and 62 is such that the presser feet advance upon the material and engage the same prior to the falling of the knife 63. Prior to the elevation of the knife, however, the presser feet are raised to clear the material and permit the subsequent actuation thereof.

The cutting operation thus leaves a length of material resting upon a table 86 (Figure 2). The mechanism for removing the successively cut portions from this table is described in applicant's copending application of which this application is a division.

The mechanism for feeding the material to the cutting mechanism is, in effect, a metering mechanism and measures a desired length of material to be introduced into the first cutting mechanism. The material is effectively cut by the operation of a movable knife in conjunction with suitable pressure members which hold the material in cutting position upon opposite sides of the movable knife.

While the invention has been described with specific reference to the accompanying drawings, it is not to be limited, save as defined in the appended claims.

I claim as my invention:

1. A cutting mechanism comprising a stationary knife, a movable knife associated therewith, spaced presser feet upon opposite sides of the movable knife to prevent movement of material to be cut, means to hold the feet yieldingly against the material, and means to move the feet against the material in advance of the movement of the knife and to elevate the feet prior to the elevation of the knife.

2. A cutting mechanism comprising a stationary knife, a movable knife associated therewith, a pivoted bifurcated arm, the movable knife lying between the bifurcations of the arm and movable independently thereof, a plurality of rods slidably mounted in each bifurcation, presser bars mounted on the rods, and springs between the bifurcations and the bars.

3. A cutting mechanism comprising a stationary knife, a movable knife associated therewith, a pivoted bifurcated arm, the movable knife lying between the bifurcations of the arm, presser bars mounted on the bifurcations, means to urge the bars normally away from the bifurcations, a plurality of power operated cams, said cams being formed to cause the bifurcated arm to move downwardly prior to the downward movement of the movable knife, and to be elevated prior to the elevation of the movable knife, and means to actuate the arm and knife by the respective arms.

4. A cutting mechanism comprising a stationary knife, a movable knife associated therewith, a pivoted bifurcated arm, the movable knife lying between the bifurcations of the arm, presser bars mounted on the bifurcations, means to urge the bars normally away from the bifurcations, a disc carrying a plurality of power operated cams, said cams being formed to cause the bifurcated arm to move downwardly prior to the downward movement of the movable knife, and to be elevated prior to the elevation of the movable knife, means to urge the arm and knife normally to an elevated position, and means to actuate the arm and knife by the respective cams.

HANS IRMSCHER.